United States Patent [19]

Lamond

[11] 4,088,192

[45] May 9, 1978

[54] HEAT ACTIVATED PLUNGER

[75] Inventor: Lee Lamond, Flanders, N.J.

[73] Assignee: Celanese Corporation, New York, N.Y.

[21] Appl. No.: 706,038

[22] Filed: Jul. 16, 1976

[51] Int. Cl.² ...................... A62C 13/24; A62C 13/42; B65B 3/04; F16K 17/40

[52] U.S. Cl. ........................................ 169/19; 137/70; 137/80; 141/20; 141/348; 169/26; 169/30; 222/402.16

[58] Field of Search ....................... 169/19, 26, 30, 57, 169/74; 137/68 R, 70, 72, 74, 79, 80; 222/54, 397, 402.16; 141/3, 20, 348; 260/67 R

[56] References Cited

U.S. PATENT DOCUMENTS

| | | | |
|---|---|---|---|
| 280,376 | 7/1883 | Horton | 137/72 X |
| 3,027,352 | 3/1962 | Walling et al. | 260/67 R |
| 3,536,139 | 10/1970 | Berti et al. | 169/26 |
| 3,635,264 | 1/1972 | Milburn | 141/348 X |
| 3,638,733 | 2/1972 | De Rouville et al. | 169/19 |
| 3,650,328 | 3/1972 | Fujiki et al. | 222/54 X |

*Primary Examiner*—Evon C. Blunk
*Assistant Examiner*—Andres Kashnikow
*Attorney, Agent, or Firm*—Linn I. Grim; T. J. Morgan; Marvin Bressler

[57] ABSTRACT

A heat actuated valve comprises a base adapted to be mounted on a fire extinguisher container. The base includes a passsage communicable with the container interior. A pair of stop fingers extend forwardly from the base. A fusible element interconnects the stop fingers. The base, stop fingers and fusible element are of one-piece, integral construction. A plunger is slidably mounted in the passage and includes a passage-blocking portion which blocks the passage when the plunger abuts the stop fingers during a fire sensing mode of operation. The plunger is slidable rearwardly to shift the passage-blocking portion to a first passage-opening position to allow the container to be filled. The plunger is operable, in response to melting of the fuse, to spread the stop fingers apart and travel forwardly sufficiently to shift the passage-blocking portion to a second passage-opening position, enabling the container contents to be discharged.

19 Claims, 7 Drawing Figures

Fig. 1
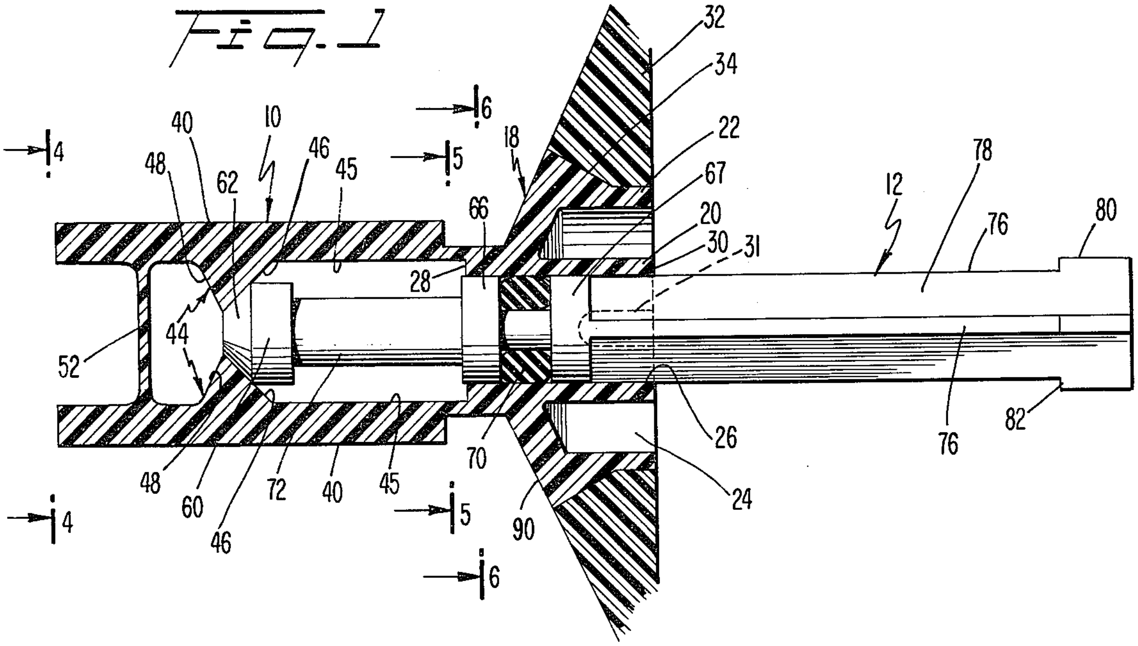
Fig. 2
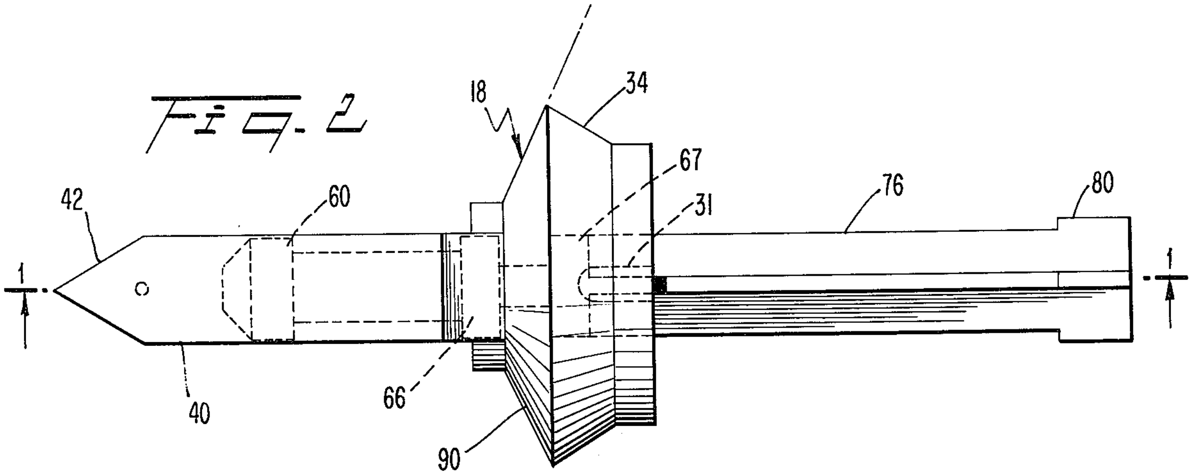
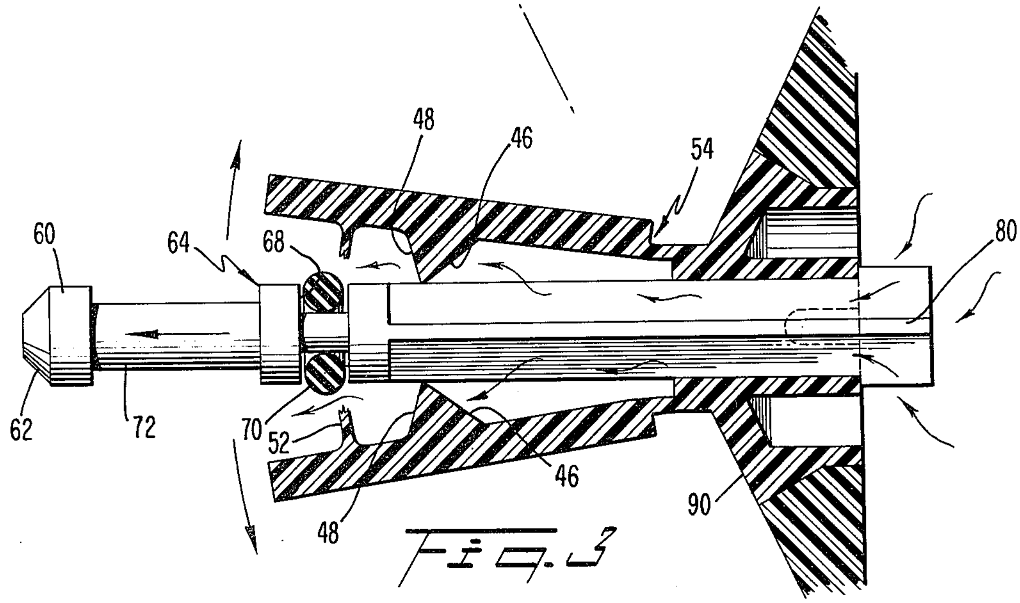
Fig. 3

Fig. 4
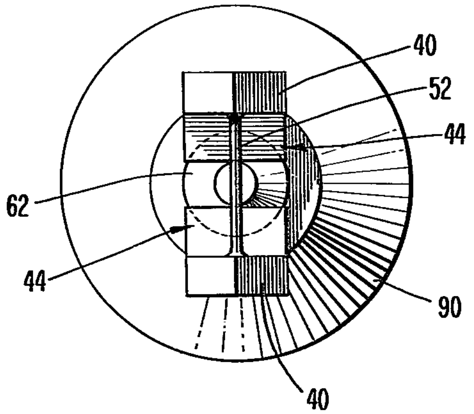
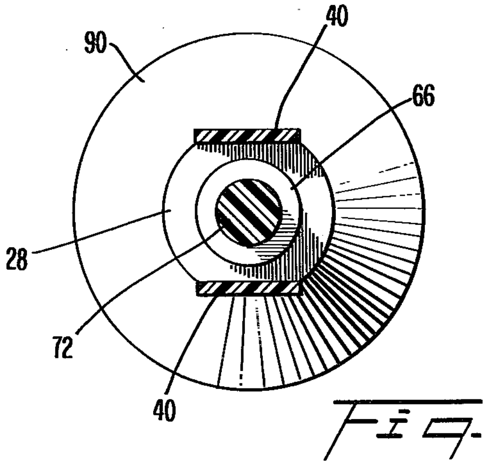
Fig. 5
Fig. 6
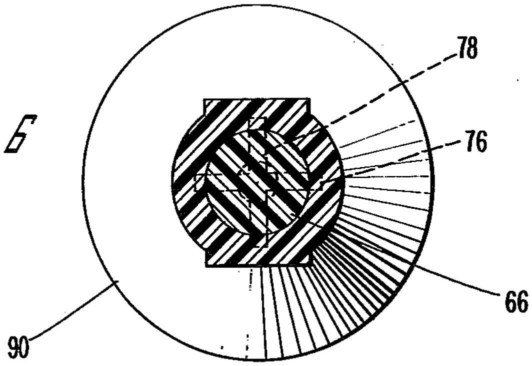
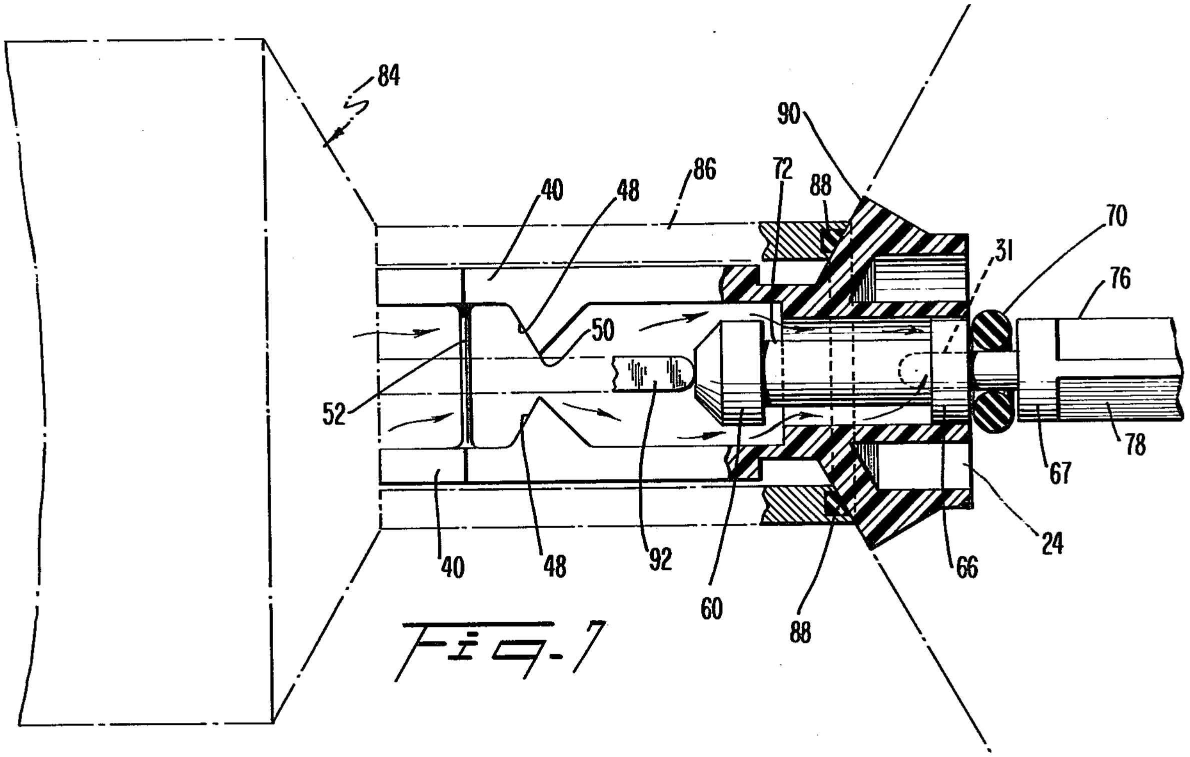
Fig. 7

HEAT ACTIVATED PLUNGER

BACKGROUND AND OBJECTS

The present invention relates to heat activated plungers and, more particularly, to a heat actuated fire extinguisher valve for discharging fire extinguishant from a container upon sensing a fire.

Heat actuated fire extinguishers have been heretofore proposed which respond automatically to excessive heat to release pressurized fire extinguishing agent from a container, as exemplified in the following U.S. Pats.: Nos. 1,931,230, issued to Laengel on Oct. 17, 1933, No. 2,115,371, issued to Mossberg on Apr. 26, 1938, No. 2,166,277, issued to Adams on July 18, 1939, No. 2,759,546, issued to Zabriskie on Aug. 21, 1956, No. 3,536,139, issued to Berti et al on Oct. 27, 1970, and No. 3,638,733, issued to DeRouville et al on Feb. 1, 1972.

Previously proposed valves have been mounted on a fire extinguisher container and typically include a slidable stem which is biased toward a fluid discharge position, while being held in a container closing position by a fusible element. When the fusible element is melted by excessive heat, the stem is released for movement to the discharge position, usually under urgings of pressurized extinguishant. Many of the proposed valves prevent filling of the container when the valve is in place. Hence, they are useful only in connection with containers having a supplemental fill port, or which pressurize the fluid by gravitational action. Present day equipment, though, usually requires containers whose contents are pressurized independently of gravity.

In the above-referenced Berti et al patent, filling of the container with the valve is accommodated by removal of the fusible linkage, which must then be replaced after the container has been filled. It would be desirable to eliminate such steps, as well as to provide a fire extinguisher valve which can be manufactured so inexpensively that replacement of the entire valve after one-time actuation is practicable.

It is, therefore, an object of the invention to provide a novel heat actuated fire extinguisher valve which is of simplified construction and which alleviates the above-described problems.

It is another object of the invention to provide a novel heat actuated fire extinguisher valve which accommodates filling of a fire extinguisher container without the need for replacement of parts.

It is another object of the invention to provide a heat actuated fire extinguisher valve which requires minimal effort to assemble.

It is a further object of the invention to provide a heat actuated fire extinguisher valve which can be economically replaced after one-time actuation.

BRIEF SUMMARY

At least some of these objects are achieved by a heat actuated valve in accordance with the present invention which comprises a base adapted to be mounted on a fire extinguisher container. The base includes a passage communicable with the container interior. A pair of stop fingers extend forwardly from the base. A fusible element interconnects the stop fingers. The base, stop fingers and fusible element are of one-piece, integral construction. A plunger is slidably mounted in the passage and includes a passage-blocking portion which blocks the passage when the plunger abuts the stop fingers during a fire sensing mode of operation. The plunger is slidable rearwardly to shift the passage-blocking portion to a first passage-opening position to allow the container to be filled. The plunger is operable, in response to melting of the fuse, to spread the stop fingers apart and travel forwardly sufficiently to shift the passage-blocking portion to a second passage-opening position, enabling the container contents to be discharged.

THE DRAWINGS

Other objects and advantages of the present invention will become apparent from the subsequent detailed description thereof in connection with the accompanying drawings in which like numerals designate like elements and in which:

FIG. 1 is a longitudinal sectional view of a fire extinguisher valve according to the present invention mounted on a fire extinguisher container, the valve being depicted in a fire sensing mode of operation;

FIG. 2 is a plan view of the fire extinguisher valve illustrated in FIG. 1;

FIG. 3 is a longitudinal sectional view of the valve, depicting the valve in a container discharge mode of operation;

FIG. 4 is a front view of the valve taken along line 4—4 of FIG. 1;

FIG. 5 is a cross-sectional view of the valve taken along line 5—5 of FIG. 1;

FIG. 6 is a cross-sectional view of the valve taken along line 6—6 of FIG. 1; and FIG. 7 is a longitudinal sectional view of the valve, depicting the valve in a container filling mode of operation.

DETAILED DESCRIPTION

A preferred heat-actuated valve according to the invention includes a housing 10 and a plunger 12 slidable within the housing.

The housing 10 includes a base 18 adapted to be connected to a fire extinguisher container.

The base 18 includes annular, radially spaced inner and outer cylindrical walls 20, 22 defining therebetween an annular chamber 24.

An annular bore or passage 26 extends centrally through the base. This passage 26 has forward and rearward ends 28, 30 and is of constant diameter therebetween. A pair of slots 31 are formed in the inner cylindrical wall 20 to communicate the passage 26 with the annular chamber 24. Connection between the base 18 and a fire extinguisher container 32 can be made in any suitable manner. For example, the base can include an inclined annular surface 34 adapted to be joined to a corresponding wall of the fire extinguisher container by ultrasonic welding. Of course, such connection can be achieved in other suitable ways such as by threaded connectors or crimped joints for example.

The container 32 can be formed of any material which is suited for connection to the body 10 and which is amply resistant to corrosive effects of the fire extinguishing agent.

Projecting forwardly from the base 18 are a pair of fingers 40. These fingers 40 extend in directions parallel to the longitudinal axis of the passage 26 and lie on opposite sides of such axis. The fingers 40 terminate in generally pointed front ends 42 (FIG. 2). Located on an inner surface 45 of each finger rearwardly of the pointed front end thereof is a projection 44. The projections extend inwardly, i.e., toward the axis, and include forwardly converging stop surfaces 46 which terminate at opposite sides of the axis. Each stop surface 46 extends at an acute angle, preferably about 45°, relative to the inner surface 45 of its associated finger 40. The front sides of the projections 44 are formed by rearwardly converging faces 48. These faces 48 extend from the inner surfaces 45 and merge with the stop surfaces to form an edge 50 (FIG. 7).

A fuse 52 is located forwardly of the projections 44 and serves to interconnect the fingers 40. The fuse comprises a thin strip of heat sensitive fusible material.

The valve body, including the base 18, the fingers 40 and the fuse 52, is preferably molded of one piece. Thus, the base, the fingers, and the fuse are integral and comprise the same material.

The valve may be formed of any thermoplastic material that is suitably resistant to corrosive effects of the fire extinguishing agent.

Oxymethylene polymers, having recurring $—OCH_2—$ units directly attached to each other, have long been known and are the preferred thermoplastic materials for use in forming the valve. Such polymers may be prepared by the polymerization of formaldehyde or trioxane, which is a cyclic trimer of formaldehyde. In a particularly preferred embodiment of my invention, the polymeric compounds are oxymethylene copolymers having at least one chain containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is, those which are free of interfering functional groups and which will not induce undesirable reactions. Particularly preferred are copolymers which contain from 60 to 99.6 mol percent of recurring oxymethylene groups. In a preferred embodiment R may be, for example, an alkylene or substituted alkylene group containing at least two carbon atoms.

Among the copolymers which may be utilized in accordance with this aspect of the invention are those having a structure comprising recurring units having the formula:

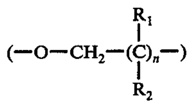

wherein $n$ is an integer from zero to 5 and wherein $n$ is zero in from 60 to 99.6 percent of the recurring units. $R_1$ and $R_2$ are inert substituents, that is, substituents which are free of interfering functional groups and will not induce undesirable reactions.

A preferred class of copolymers are those having a structure comprising oxymethylene and oxyethylene recurring units wherein from 60 to 99.6 percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane or formaldehyde with a cyclic ether having the structure

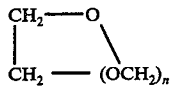

where $n$ is an integer from zero to 2.

Examples of preferred polymers include copolymers of trioxane and cyclic ethers containing at least two adjacent carbon atoms, such as the copolymers disclosed in U.S. Pat. No. 3,027,352 to Walling et al, which patent is assigned to the same assignee as the subject application and is herein incorporated by reference.

Among the specific cyclic ethers which may be used are ethylene oxide; 1,3-dioxolane; 1,3,5-trioxepane; 1,4-dioxane; trimethylene oxide; pentamethylene oxide; 1,2-propylene oxide; 1,2-butylene oxide; neopentyl formal; pentaerythritol diformal.

A preferred polymer which is highly suited for forming the valve is Celcon oxymethylene copolymer available commercially from Celanese Corporation.

The design of the body 18 is such that the fingers, at the location 54 where jointed to the base 18, are of reduced thickness to define a weakened joint for purposes to be subsequently discussed (FIG. 3).

The plunger 12 is slidably mounted in the passage 26 for forward and rearward movement along the axis. At its forward end the plunger includes an annular head 60 which carries a frusto conical wedge surface 62. This wedge surface 62 extends at an acute angle, preferably about 45°, relative to the axis and thereby abuts flush against the top surfaces 46.

Intermediate its front and rear ends the plunger 12 includes a passage-blocking portion 64 which includes a pair of annular collars 66, 67. These collars 66, 67 are axially spaced to form an annular groove 68 therebetween. The diameter of each collar is just slightly less than that of the passage 26. A sealing ring, in the form of an annular, resilient O-ring 70 is mounted within this groove 68. In its uncompressed state, the O-ring 70 bulges outwardly beyond the passage. When situated within the passage 26, the O-ring 70 is compressed by the inner wall of the passage so as to be sealingly engaged therewith.

If desired, the groove 68 in the plunger 12 could be eliminated, and the O-ring could be mounted within the passage so as to sealingly engage a passage blocking portion of the plunger when in a fire-sensing mode.

As a further alternative, suitable sealing action could be achieved by forming the plunger with an integral radially outwardly projecting annular ridge. This ridge can be made slightly larger than the diameter of the passage and sufficiently flexible to compressively engage the passage wall to provide a fluid seal.

Between the forward-most collar 66 and the head 60, the plunger 12 includes a portion 72 of reduced diameter to define a fluid channel, as will be later discussed.

Rearwardly of the rear-most collar 67 the plunger includes a plurality of longitudinally extending fins 76. In radial extent, these fins terminate short of the inner wall of the passage 26, preferably at the same level as the collars 66, 67. The fins 76 are circumferentially spaced so as to be X-shaped in cross-section (FIG. 6). The spaces 78 between adjacent fins 76 form fluid channels, for reasons to be discussed subsequently. The rear ends of the fins include radially enlarged portions 80 which extend radially beyond the inner wall of the passage 26. These enlarged portions thus form shoulders 82 engageable with the rear end 30 of the wall 20 to limit forward travel of the plunger 12.

The plunger is molded in one piece of a material suitably resistant to corrosive effects of the fire extinguishing agent, such as a nylon material, for example.

The plunger 12 enables the fire extinguisher to be filled with fire extinguishing agent with the valve mounted in place thereon. Filling of the container can be accomplished by displacing the plunger 12 rearwardly a sufficient distance from the stop surfaces 46 to move the seal rearwardly beyond the front ends of the slots 31 to a passage-opening position, as depicted in FIG. 7, and then introducing fluid under pressure through the passage 26 and into the container.

Suitable equipment for achieving this filling procedure can assume many forms. For example, a filling vessel 84 can be employed which contains pressurized fire extinguishing fluid (depicted in phantom in FIG. 7). The mouth 86 of the filling vessel can be inserted over the valve to bring a sealing edge 88 of the vessel into engagement with a front surface 90 of the base 18. Simultaneously, a pair of arms 92 on the vessel, which arms straddle the fuse, depress the plunger 12 from the stop surfaces 46. A suitable valve on the vessel can then be opened to permit pressurized fluid from the vessel to travel through the reduced diameter portion 72 of the plunger 12, and into the fire extinguisher container via the slots 31 and the annular chamber 24. When the filling vessel 84 is removed, pressurized fluid within the container acts against at least the rear surface 94 of the rear-most collar 67 to displace the plunger forwardly against the stop surfaces 46. In such forward position, the passage 26 is blocked by the blocking portion 64, and discharge of the fire extinguishant is prevented.

ASSEMBLAGE AND OPERATION

The valve is formed by molding the body and plunger portions 10, 12. If an O-ring is to be employed, it is installed within the groove 68 of the plunger 12. The plunger 12 is inserted into the passage 26, and the base 18 of the body is secured to a fire extinguishing container 32.

To fill the container 32, the filling vessel 84 is placed against the valve body so that the arms 92 displace the plunger 12 rearwardly a sufficient distance to shift the O-ring 70 past the front ends of the slots 31. Pressurized fluid from the vessel 84 travels through the reduced diameter portion 72 and into the container via the slots 31 and annular chamber 24 (FIG. 7). When the container reaches a filled state, the vessel 84 is removed and pressurized fluid within the container shifts the plunger 12 against the stop surfaces 44 and the passage 26 is effectively blocked (FIG. 1).

The container can now be properly oriented in a proper fire sensing position at the site to be protected. If a fire breaks out, the fuse, upon reaching its fusible temperature, melts.

In the absence of the restraint formerly applied by the fuse, the force of the pressurized extinguishant acting upon and urging the plunger forwardly is sufficient to cause the plunger 12 to advance and spread the fingers 40 apart about the weakened regions 54, aided by the wedge-like configuration of the wedge surface 62. The plunger 12 advances, until the shoulders 82 of the fins 76 engage the rear end of the base 18 (FIG. 3). In so doing, the O-ring travels from the passage 26 to a passage-opening position, allowing pressurized fluid to be discharged from the container through the spaces 78 between the fins 76.

The valve according to the invention is preferably adapted for one-time use only and to thereafter be replaced. Since the valve is relatively inexpensive to manufacture, valve replacement is economically practicable. If desired, though, the principles of the present invention could be incorporated within valves of the reusable type.

Assemblage of the valve is effected by merely installing the plunger within the valve body. There is no need to couple a separate release fuse or fuse linkage to the plunger, as is required by some previously proposed fire extinguisher valves. Moreover, the valve, even when mounted on the container, enables the container to be filled with the fuse in place.

While the invention has been described in the foregoing description as being preferably adapted for use in a fire extinguishing environment, it will be realized by those skilled in the art that principles of the invention can be employed elsewhere such as in areas wherein activation of a plunger in response to the attainment of a preselected temperature condition performs a useful function like activating a circuit or starting a motor, etc.

It will be appreciated by those skilled in the art that further additions, modifications, substitutions and deletions not specifically described may be made without departing from the spirit and scope of the invention as defined in the appended claims.

What is claimed is:

1. A heat actuated apparatus comprising:

a base;

a pair of spreadable stop fingers joined to and extending forwardly from said base, said fingers each including an inclined surface, said surfaces converging in a forward position, a fusible element interconnecting said stop fingers to restrain said stop fingers from spreading, and a forwardly biased plunger having surfaces converging in a forward position slidably mounted in said base and normally abutting said stop fingers in a first mode of operation;

said forwardly biased plunger being operable, in response to melting of said fusible element and as a result of the action of the plunger's converging surfaces on the converging surfaces of the spreadable stop fingers, to spread said stop fingers apart and travel forwardly in a second mode of operation.

2. Apparatus according to claim 1 wherein said base, said stop fingers and said fuse are of one-piece construction.

3. Apparatus according to claim 2 wherein said one-piece construction comprises an oxymethylene copolymer having at least one chain containing recurring oxymethylene units interspersed with —OR— group in the main polymer chain, where R is a divalent radical containing at least two carbon atoms directly linked to each other and positioned in the chain between the two valences, with any substituents on said R radical being inert.

4. A heat actuated valve comprising:

a base adapted to be mounted on a fire extinguisher container and including a passage communicable with the container interior, a pair of spreadable stop fingers joined to and extending forwardly from said base, said fingers each including an inclined surface, said surfaces converging in a forward position, a fusible element interconnecting said stop fingers to restrain said stop fingers from spreading, and a plunger having surfaces converging in a forward position slidably mounted in said passage and including a passage-blocking portion which blocks said passage when said plunger abuts said stop fingers during a fire sensing mode of operation;

said plunger being slidable rearwardly to shift said passage-blocking portion to a first passage-opening position to allow the container to be filled; said plunger being operable, in response to melting of said fusible element and as a result of the action of the plunger's converging surfaces on the converging surfaces of the spreadable stop fingers, to spread said stop fingers apart and travel forwardly sufficiently to shift said passage-blocking portion to a second passage-opening position, enabling the container contents to be discharged.

5. A valve according to claim 4 wherein said passage-blocking portion includes a sealing ring engageable with an inside wall of said passage.

6. A valve according to claim 4 wherein said base includes an annular chamber extending around said passage, and a plurality of slots communicating said passage with said chamber; said passage-blocking portion being disposed rearwardly of forward ends of said slots in said first passage-opening position.

7. A valve according to claim 4 wherein said base, said stop fingers, and said fuse are of integral one-piece construction.

8. A valve according to claim 7 wherein said one-piece construction of said base, said stop fingers, and said fuse are formed of an oxymethylene copolymer having at least one chain containing recurring oxymethylene units interspersed with —OR— group in the main polymer chain, where R is a divalent radical containing at least two carbon atoms directly linked to each other and positioned in the chain between the two valences, with any substituents on said R radical being inert.

9. A heat actuated valve comprising: a one-piece housing body including an integral base, spreadable stop fingers joined to and extending forwardly from said base, said fingers each including an inclined surface, said surface converging in a forward position, and fuse, interconnecting said stop fingers to restrain said stop fingers from spreading;

said base adapted to be mounted on a fire extinguisher container and including a fluid passage;

said fuse arranged to retain said stop fingers in a stop position, and a plunger having surfaces converging in a forward position slidably mounted in said passsage; said plunger being engageable with said stop fingers to limit forward travel of said plunger during a fire sensing mode of operation;

said plunger including a passage-blocking portion arranged to block said passage with said plunger in said fire sensing mode;

said plunger being slidable rearwardly relative to said passage to shift said passage-blocking portion to a first passage-opening position, allowing the container to be filled;

said plunger being operable, in response to melting of said fuse and as a result of the action of the plunger's converging surfaces on the converging surfaces of the spreadable stop fingers, to advance and displace said stop fingers outwardly from

10. A valve according to claim 9, wherein said passage blocking portion includes a sealing ring engageable with an inside wall of said passage.

11. A valve according to claim 9 wherein said base includes an annular chamber extending around said passage, and a plurality of slots communicating said passage with said chamber; said passage-blocking portion being disposed rearwardly of forward ends of said slots in said first passage-opening position.

12. A heat responsive fluid control valve adapted to be mounted on a fire extinguishing container, said valve comprising:

a mounting portion having a fluid passage and being adapted to be mounted on the fire extinguisher container, opposed spreadable fingers projecting forwardly from said mounting portion on opposite sides of the axis of said passage, said fingers each including an inclined stop surface, said surfaces converging in a forward direction;

a heat sensitive element interconnecting said fingers forwardly of said stop surfaces to restrain said fingers from spreading, a plunger slidably mounted in said passage, a front end of said plunger including a forwardly converging wedge surface engageable with said stop surfaces so as to be restrained against forward displacement;

said plunger including sealing means located rearwardly of said wedge surfaces;

said sealing means being disposed in passage sealing relationship within said passage when said wedge surface abuts said stop surfaces to prevent discharge of fluid through said passage;

said plunger being displaceable sufficiently rearwardly to move said sealing means rearwardly out of said sealing relationship, allowing fire extinguishing fluid to be introduced through said passage and into the container; said heat sensitive element being fusible in response to reaching a selected temperature to allow said plunger, under the urgings of pressurized fluid in said container, to spread said fingers apart and travel sufficiently forwardly to move said sealing means forwardly out of said sealing relationship, permitting fluid to be discharged from the container.

13. A valve according to claim 12 wherein said base, said fingers and said heat sensitive element are of integral one-piece construction.

14. A valve according to claim 13 wherein said fingers are joined to said base by a weakened connection.

15. A valve according to claim 12 wherein said sealing means comprises a sealing ring carried within a groove of said plunger and engageable with an inside wall of said passage.

16. A valve according to claim 12 wherein said base includes an annular chamber extending around said passage, and a plurality of slots communicating said passage with said chamber; said sealing means being disposed rearwardly of forward ends of said slots when said container is being filled.

17. A valve according to claim 12 wherein said plunger includes a portion of reduced thickness ahead of said sealing means, and a finned portion rearwardly of said sealing means; said portion of reduced thickness being arranged to conduct fluid into the container during filling thereof; said finned portion being arranged to conduct fluid from the container during fluid discharge.

18. A valve adapted to be mounted on a fire extinguisher container, said valve comprising:

a one-piece housing including a base, a pair of spreadable fingers integral with said base and a fuse integral with said fingers to restrain said fingers from spreading, said base being formed of an oxymethylene polymer and being adapted for connection to the fire extinguisher container and comprising:

a passage extending therethrough and being communicable with the interior of the container;

an annular chamber surrounding a rear portion of said passage and being communicable with the interior of the container;

a plurality of slots communicating a rear portion of said passsage with said annular chamber; said fingers projecting forwardly of said base on opposite sides of the axis of said passage; each finger including a stop surface, said stop surfaces converging in a forward direction;

said fuse interconnecting said fingers forwardly of said stop surfaces;

a plunger slidably mounted in said passage, said plunger comprising:

a front head including a forwardly converging wedge surface which, when said plunger is biased forwardly by pressurized fluid in the container, abuts and is restrained by said stop surfaces while tending to spread said fingers apart;

a portion of reduced thickness disposed rearwardly of said wedge surface; a pair of longitudinally spaced annular collars defining a groove therebetween; a plurality of longitudinally extending circumferentially spaced fins disposed rearwardly of said collars;

said fins terminating rearwardly in shoulders which define stops limiting forward movement of said plunger through said passage; and a sealing ring carried in said annular groove of said plunger;

said sealing ring being operable to sealingly engage the inner wall of said passage;

said plunger being rearwardly displaceable to move said sealing ring rearwardly of front ends of said slots to establish a first bypass channel permitting fire extinguishing fluid to be introduced into the container;

said fuse being fusible upon reaching a selected temperature to enable said plunger to spread said fingers apart and travel forwardly under the urging of pressurized fluid in the container until stopped by said shoulders of said fins, so that said sealing ring is displaced from said passage and said passage is completely traversed by said fins to establish a second bypass channel permitting pressurized fluid to be discharged from the container.

19. A valve according to claim 13 in which the oxymethylene polymer is a copolymer having at least one chain containing recurring oxymethylene units interspersed with —OR— groups in the main polymer chain, where R is a divalent radical containing at least two carbon atoms directly linked to each other and positioned in the chain between the two valences, with any substituents on said R radical being inert.

* * * * *